3,411,866
METHOD AND APPARATUS FOR MAINTAIN-
ING PROPER REACTIVATION OF ABSORBENT
SOLUTION
Harry Allen Jewell, Louisville, Ky., assignor to Girdler
Corporation, Louisville, Ky., a corporation of Ohio
Filed Jan. 8, 1965, Ser. No. 424,250
7 Claims. (Cl. 23—2)

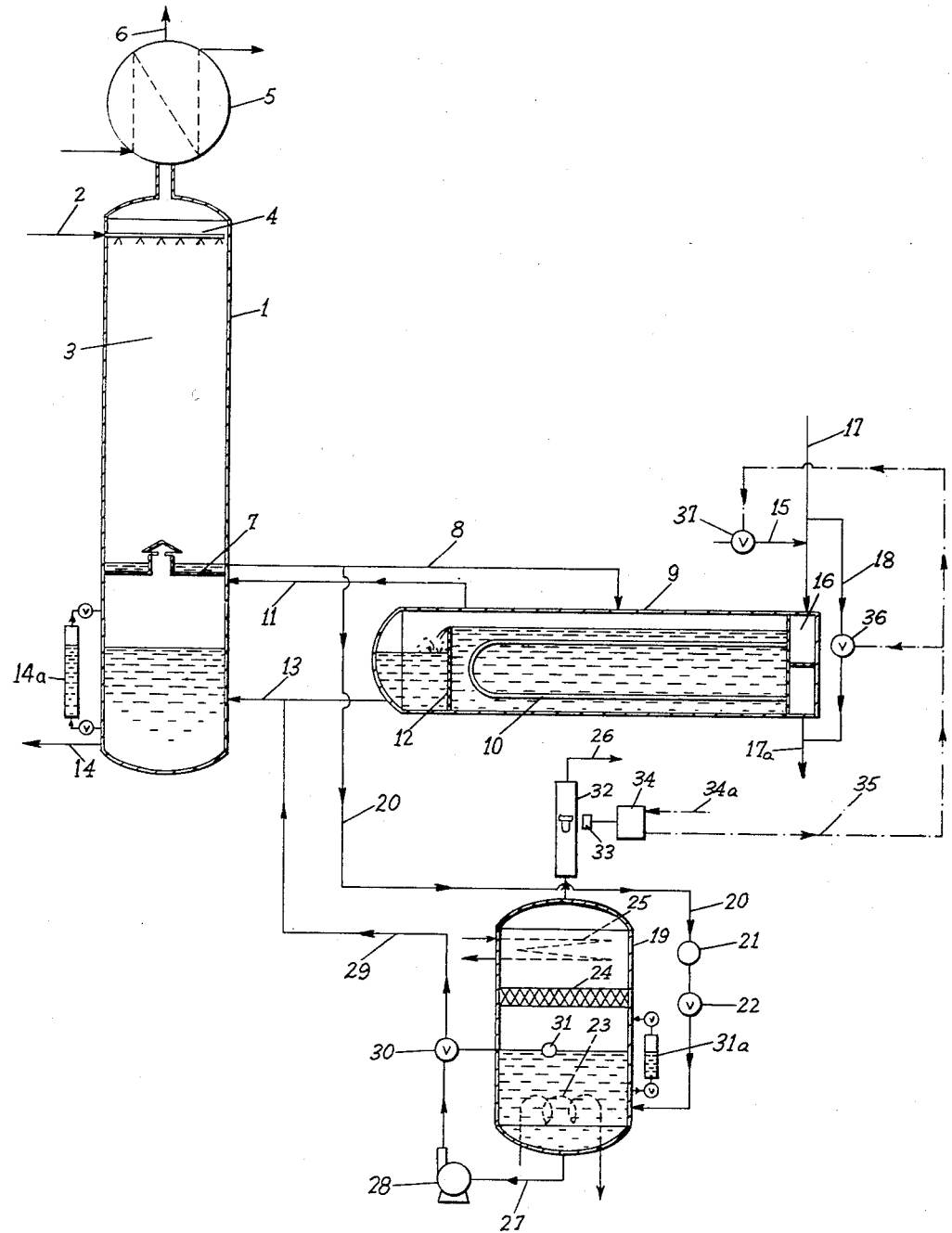

ABSTRACT OF THE DISCLOSURE

Process and apparatus for automatically maintaining proper reactivation of an acidic gas absorbent solution in a reactivator which is heated by steam generated from the absorbent in an associated indirectly steam heated reboiler wherein a portion of the absorbent solution passing from the reactivator to the reboiler is diverted to a test vessel wherein it is heated, the degree of gas evolution therefrom determined and, in response to such determination, automatically activating means either (1) to admit steam to the reboiler heating means or (2) to cause the steam to by-pass the reboiler heating means.

---

As is well known in the art of producing controlled gaseous mixtures, e.g., process gases or components thereof for the synthesis of ammonia, it is a common practice to remove carbon dioxide from the raw gases in an absorber tower in which the gases are brought into intimate contact with a water solution of a substance which is capable of absorbing carbon dioxide. There are a number of such solutions including potassium carbonate solutions, and solutions of one or more of the ethanolamines. In some instances monoethanolamine or diethanolamine are used in relatively small quantities as activators in a solution of potassium carbonate.

While the circumstances of use of the invention as above outlined constitute an important aspect of utility, the skilled worker in the art will understand that there are other circumstances in which it is necessary or desirable to absorb carbon dioxide from gaseous mixtures, and in which the invention may be employed to good effect.

The absorber tower is filled with Raschig rings or bubble plates to bring about the necessary intimate contact; and the absorber solution is showered downwardly in the tower in countercurrent flow to the ascending gases to be treated. For purposes of an exemplary disclosure the invention will be described in connection with the use of an ethanolamine solution. The solution as it enters the absorber tower will be referred to as the "lean solution." After the solution has absorbed as much of the acid gases, such as carbon dioxide, hydrogen sulfide, or the like as it will absorb in the absorber tower, it will be referred to herein as the "rich solution."

It is common practice in th art to recirculate the absorber solution to regenerate it. This is done by heating the solution so as to drive the acidic gases from it and to convert it from the rich condition to the lean condition. It is a common practice to use the waste heat of a process gas stream to bring the rich solution to the boiling point in a "waste heat reboiler." Additional heat from an external source or sources is usually employed. This may be done in several ways such as by using direct heating means, or heat exchange means, or by adding steam to the treated gases, or by a combination of these expedients.

The proper operation of a regenerative system depends upon a precise balance of the factors involved. If insufficient heat is added to regenerate the solution properly, the absorption of acidic gases will be reduced and the desired gaseous end product may not be attained. Moreover, the presence of acidic constituents in the regenerated solution subjects the whole apparatus to corrosive conditions which would greatly increase the cost of the installation if the difficulty were attempted to be met by the use of corrosive resistant materials.

If more heat is applied than is necessary to regenerate the solution, unnecessary and wasteful amounts of steam may be used, requiring an excess of cooling water to condense the steam. Also, there can be an increase of chemical carry-over. This is to say that some of the solution, as well as vapors of ethanolamine may be driven into the outlet for the carbon dioxide or other acidic gases. Since the carbon dioxide released by regeneration of the rich absorber solution is frequently exhausted to the atmosphere, a carry-over of ethanolamine can become hazardous to the plant personnel. Vapors or a solution of ethanolamine are very irritating to the eyes. Moreover, if ethanolamine solution is sprayed over the plant area, a very slippery condition is produced. It will further be clear that loss of ethanolamine is to be avoided for cost reasons.

Hitherto, it has been the practice to maintain a fixed flow of the absorber solution and attempt to control the addition of heat by hand regulation. Such regulation is either a matter of guesswork or it requires the running of time-consuming chemical analyses. The basic object of this invention therefore is the provision of automatic controls for a waste heat reboiler.

It is an object of the invention to provide means and a method for reducing corrosion in the plant apparatus.

It is an object of the invention to provide means and a method for maintaining proper reactivation of the absorber solution while changing the plant production rate.

It is an object of the invention to make the plant more economical to operate through savings on heat input and reduced chemical loses.

It is an object of the invention to provide means and a method for eliminating certain hazards to plant personnel.

These and other objects of the invention which will be set forth hereinafter or will be apparent to one skilled in the art upon reading these specifications, are accomplished in that apparatus assembly and by that procedure of which an exemplary embodiment will now be described.

Reference is made to the accompanying drawing which illustrates diagrammatically the essential features of the present invention.

In the practice of the invention, the rich absorbent solution containing carbon dioxide is delivered from a conventional absorber (not shown) by a conduit 2 to a reactivator 1. The reactivator is an elongated tower-like device containing a packing diagrammatically indicated at 3. The packing may take various forms, but conveniently constitutes a mass of Raschig rings or other inert shapes so that the absorbent solution, sprayed downwardly by a distributor 4 will flow over the packing material by which it will be made accessible to steam flowing upwardly within the reactivator. The steam serves to strip the carbon dioxide from the solution.

The mixture of carbon dioxide and steam enter an acid-gas cooler diagrammatically indicated at 5. It may be cooled by any suitable means such as water or refrigerant; and the result of the cooling is to condense the steam in the gases from the reactivator, the carbon dioxide being vented through a conduit 6 to a place of release or a means for using the gas. The condensed steam is returned as water to the reactivator 1 by a conventional conduit (not shown) to maintain the water balance.

The skilled worker in the art will understand that the rich solution entering the desorber tower at 2 will have carbon dioxide or other acidic gases stripped from it by the action of steam passing through the tower in countercurrent flow with respect to the rich solution. If the quantity of steam generated in the apparatus is too small, there will not be an adequate desorption or conversion of the rich solution to the lean solution. Under these circumstances the quantity of acidic gases stripped from the gaseous mixture in the absorber tower (not shown) will be too little, necessitating an abnormal flow volume of the absorber solution, if compensation is to be made. The steam for stripping in the desorber tower is generated from the absorbent solution in the reboiler as hereinafter described. Should the absorbent solution be insufficiently stripped in the desorber tower, there will be a substantial evolution of acidic gases in the reboiler. This would increase the volume of gaseous flow through the desorber tower, and would be likely to produce foaming and spitting. In an ideal operation the acidic gases would be stripped from the rich absorber solution substantially entirely in the desorber tower, and there would be substantially no evolution of carbon dioxide or other acidic gases in the reboiler. The attainment of this ideal condition is difficult where reliance is had on hand adjustment.

The now lean absorbent solution, from which a substantial quantity of carbon dioxide has been stripped, collects on a chimney tray 7 in the reactivator, whence it is delivered by a conduit 8 to a reboiler 9. In the reboiler, which is a horizontally elongated vessel, there will be located a heating means illustrated as a coil 10 through which a hot fluid is flowing. This hot fluid will comprise a stream of process gases which are at a high temperature. The purpose of the heating means is to evaporate some of the water from the absorbent solution, forming steam which is delivered by a conduit 11 to the reactivator at a point below the chimney tray 7, and flows upwardly through the reactivator packing as above described.

As illustrated, the reboiler 9 contains a weir 12 the purpose of which is to insure submersion of the heating means 10. The heating in the reboiler results in the boiling of the absorbent solution and the consequent generation of steam. The lean solution, collecting beyond the weir, is returned by a conduit 13 to the lower portion or sump of the reactivator, whence the lean solution may be pumped to the absorber tower (not shown) through a conduit 14 with such temperature control means as may be found desirable. A sight glass 14a may be provided if desired in connection with the sump so that the operator can be informed of the available quantity of lean or regenerated absorbent solution.

The "waste heat" used to bring about the boiling of the solution in the reboiler may be obtained from any gas stream of sufficient quantity and temperature to bring about the desired degree of regeneration. In the case of a hydrogen or synthesis gas plant, for example, the gas stream often used is the CO converter effluent.

The desired degree of regeneration should be attained completely in the reactivator. Only during abnormal operation (i.e., inadequate steam generation caused by insufficient heat input) will the acid gas be driven off in the reboiler. This is one of the conditions this invention seeks to avoid.

The elements thus far described are essentially conventional, including the addition of steam via conduit 15 to the process gas stream which enters the reboiler heating coil manifold 16 through a conduit 17. An addition of steam to the process gases flowing through the coil or coils 10 is usually practiced where the process gases themselves are not of sufficient quantity or of a suitably high temperature. Should the process gases contain excess heat, however, it is also conventional to shunt some of these gases around the reboiler by means of a valved conduit 18. The process gases after leaving the manifold 16 will be carried by a conduit 17a to a place of utilization (not shown).

Hitherto there has been no automatic control for a system such as that described above. The various operators have endeavored to keep the system in operation by manipulation of valves in the steam conduit 15, or in the bypass conduit 18 or by controlling the flow of rich and lean absorber solution from and to the absorber tower. The best indication of the proper functioning of the apparatus has been obtained by periodic analysis of the lean solution to determine whether it has been sufficiently regenerated. Such analysis is time-consuming, and hence a matter of substantial cost. It does not, in any event, indicate whether the absorber solution has been subjected to overheating in the reboiler, nor does it indicate the degree of regeneration which may be taking place in the reboiler. Overheating of the solution may result in a chemical breakdown of it, while excessive regeneration in the reboiler tends to subject the equipment to corrosion.

In accordance with the practice of the invention a branch conduit 20 is connected into the lean solution conduit 8 so as to divert a relatively small part of it, say, 2 to 5%. A test vessel 19 is provided as later described, and the diverted lean solution is measured as to quantity by a flow indicator 21 and is delivered to the lower portion of the test vessel 19. A valve 22 in the conduit 20 permits the attainment of a constant flow in the diverted stream when adjusted in connection with the showing of the flow indicator 21. The skilled worker in the art will understand how conventional apparatus may be employed to attain a constant flow, thus combining the functions of elements 21 and 22.

In the base of the test vessel 19 the diverted lean absorbent solution is raised to the boiling point by heating means 23. Electric or steam heat may be employed. Steam and any carbon dioxide evolved from the lean solution in the test apparatus flows upwardly over a screen 24 which acts as a demister and thence over cooling coils 25 which serve to condense the steam and cool the carbon dioxide. The condensate returns to the bottom of the test vessel 19 through the screen 24, while the carbon dioxide is vented through a conduit 26.

After treatment in the test vessel, the lean absorbent solution is withdrawn at the bottom by a conduit 27, and is passed through a booster pump 28 whence it returns via conduit 29 to the conduit 13 which returns the lean solution to the regenerator. The conduit 29 has a valve 30 which is controlled by a float 31 within the vessel, the valve acting to maintain a constant level of solution in the test apparatus. A sight glass may be provided as at 31a if desired.

The carbon dioxide leaving the test vessel 19 passes through a flow indicator 32 in the conduit 26. This flow indicator may be of any suitable type. A flow indicator of the type commonly called a "Rotameter" will be found satisfactory.

The flow indicator is provided with a means diagrammatically indicated at 33 for deriving a signal from the indicator, and this means in turn is connected to a device 34 which is adapted to produce impulses in accordance with the signals received from the flow indicator. There are various forms of apparatus which may accomplish this end; and the element 33 is of a type which will be recognized by the skilled worker in the art as a "transmitter" while the element 34 will similarly be recognized as a "controller." The impulses produced by the controller 34 are designed to effect the operation of a valve 37 in the steam conduit 15 and of a valve 36 in the bypass conduit 18. This may be done electrically if desired; but as illustrated the controller 34 is a pneumatic apparatus receiving compressed air through a conduit 34a from a source not shown, and adjusted to provide a 3 to 15 p.s.i.g. signal through an air conduit 35 which is connected both to valves 36 and 37.

In the operation of the described apparatus, if there is excessive heat input to the reboiler 9, very little if any carbon dioxide will be evolved in the test vessel 19. As a consequence the output signal from the controller 34 will be in the range of, say, 3 to 7 p.s.i.g. Such a signal will serve to open, at least partially, the valve 36 in the bypass conduit 18 which will have the effect of reducing the heat input to the reboiler 9. On the other hand if there is insufficient heat input to the reboiler 9 there will be a substantial flow of carbon dioxide from the test vessel 19 through the conduit 26. This will result in a signal from the controller 34 of, say, 11 to 15 p.s.i.g. The result of such a signal will be the opening of valve 37 in the steam conduit 15.

At some intermediate point the output signal from the controller may be in the range of, say, 8 to 10 p.s.i.g. In such a case both the valve 37 and the valve 36 will be in closed or substantially closed condition. Such a condition would be regarded as a normal operating condition for the plant.

The apparatus described furnishes a continuous automatic controlling means for a regeneration system as will now be clear; and the disadvantages first set forth in this application will be avoided.

Modifications may be made in the invention without departing from the spirit of it.

The embodiments of the invention in which an exclusive property or privilege is claimed are defined as follows:

I claim:

1. In an absorption system wherein acidic gases are removed from mixed gases by an absorbent solution, a desorber tower, a reboiler for heating an absorbent solution from which some carbon dioxide has been eliminated in the desorber tower, conduit means for delivering said absorbent solution from said desorber tower to said reboiler, means for heating the said solution in the reboiler, which means employs a gaseous mixture at an elevated temperature, conduit entrance means for delivering the gaseous mixture to said heating means and conduit exit means for removing it therefrom, a bypass means containing a first valve and connecting said entrance means and said exit means, a steam conduit containing a second valve coupled with said entrance means, conduit means for delivering steam from said reboiler to said desorber tower, conduit means for delivering regenerated absorbent solution from said reboiler to said desorber tower a branch circuit comprising a test vessel, conduit means for conducting to said test vessel a portion of said absorbent solution passing from said desorber tower to said reboiler, means for heating the solution in said vessel to the boiling point whereby to evolve some acidic gases from it, means for condensing water from the evolved acidic gases, a flow meter measuring the quantity of acidic gases evolved in said test vessel, means actuated by said flow meter to control said first and second valves differentially, and conduit means for conducting said boiled solution from said test vessel to said desorber tower.

2. The structure claimed in claim 1 wherein said desorber tower has packing and a chimney plated located intermediate its length, and wherein said conduit means for delivering absorbent solution from said reboiler to said desorber tower is connected to a lower portion of said desorber tower whereby to cause regenerated solution to collect in said lower portion of said desorber tower.

3. The structure claimed in claim 2 wherein said test vessel has a sump for the collection of absorber solution in said branch circuit, said means for removing water from the evolved acidic gases being cooling means in the upper portion of said test vessel, said test vessel having an exit conduit for the acidic gases in connection with which said flow meter is located.

4. The structure claimed in claim 3 wherein means are provided for maintaining a constant flow of solution through said conduit means for conducting absorbent solution from said desorber tower to said test vessel.

5. The structure claimed in claim 4 wherein the means for differentially actuating said first and second valves is a means for deriving a pneumatic signal from said flow meter.

6. In a process of removing acidic gases from mixed gases by means of an absorbent solution, and regenerating the said solution, wherein use is made of a reboiler and a desorber tower, absorbent solution from which some carbon dioxide has been eliminated in said desorber tower being conducted from said desorber tower to said reboiler and steam and absorbent solution being conducted to said desorber tower from said reboiler, the steps of heating said reboiler by heat exchange with a hot gas stream, controlling the temperature of said gas stream by admitting steam to it when the temperature becomes too low and by causing a portion of said gas stream to bypass the reboiler when the temperature becomes too high, and controlling the admission of steam and the bypassing action in accordance with a constant determination in a branch circuit of the amount of acidic gases which can be driven from a portion of said solution being conducted from said absorber tower to said reboiler by heating said portion of said solution to its boling point.

7. The structure claimed in claim 4 including means for maintaining a constant level of said absorbent solution in said test vessel.

References Cited

UNITED STATES PATENTS 3,338,664  8/1967  Bally et al. _____ 23—2

OSCAR R. VERTIZ, *Primary Examiner.*

E. C. THOMAS, *Assistant Examiner.*